Patented July 31, 1923.

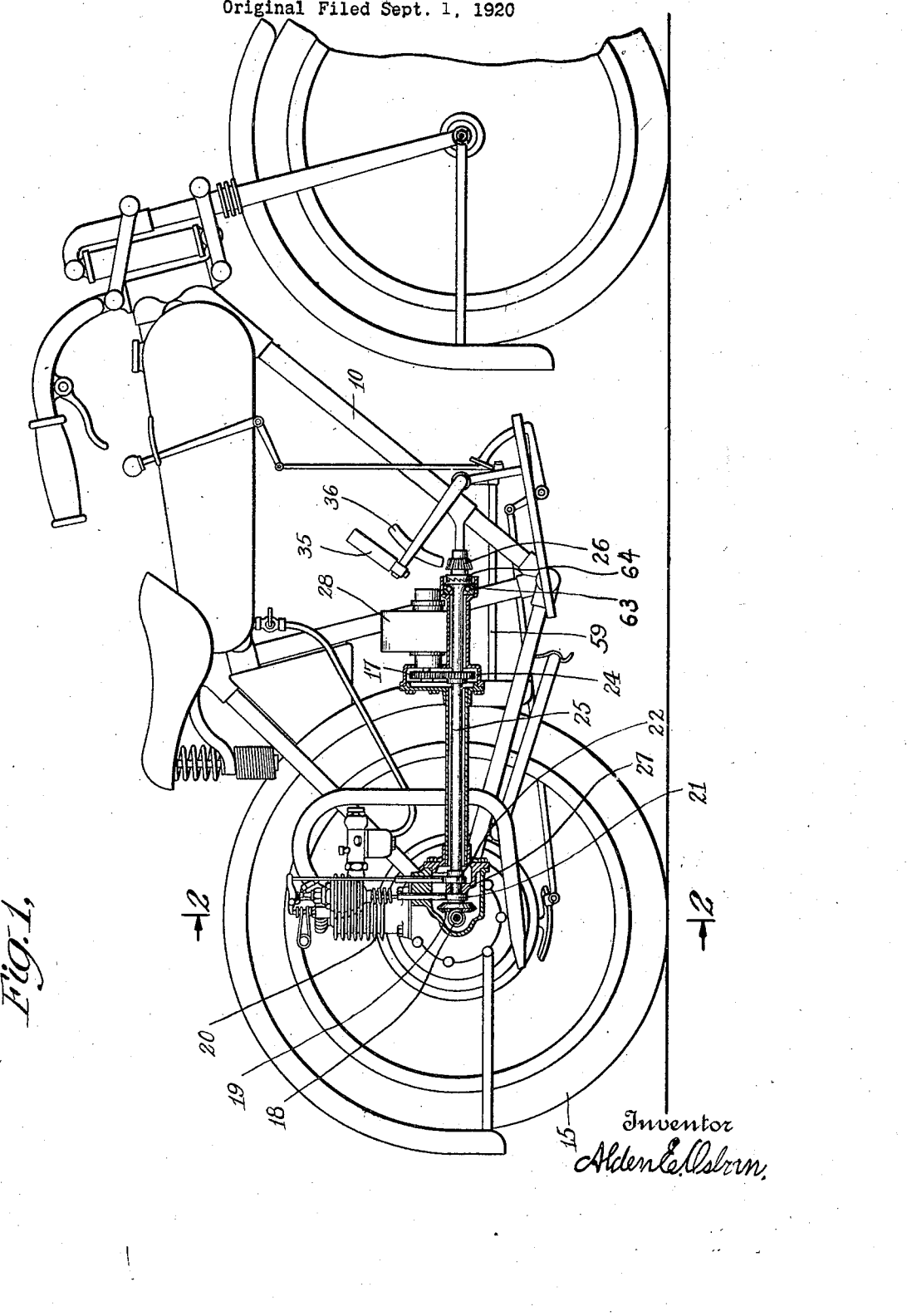

1,463,371

UNITED STATES PATENT OFFICE.

ALDEN E. OSBORN, OF NEW YORK, N. Y.

MOTOR VEHICLE.

Original application filed September 1, 1920, Serial No. 407,373. Divided and this application filed August 13, 1921. Serial No. 491,960½.

*To all whom it may concern:*

Be it known that I, ALDEN E. OSBORN, a citizen of the United States of America, and a resident of New York, county of the Bronx, and State of New York, have invented certain new and useful Improvements in a Motor Vehicle, of which the following is a specification.

This invention relates particularly to a type of self propelled vehicle in which the main driving shaft of the propelling motor is concentric with the traction wheel and passes thru the axle of said wheel. It can, however, be applied with advantage to any type of motor vehicle where it is desirable to apply the engine starting means at a point at right angles to the engine shaft such as would be the case if the engine shaft were arranged across the vehicle and it is desired to have the starting crank in front. The features of the invention lie in the arrangement of the valve operating means, magneto drive, and starting mechanism of the engine.

In the accompany drawing I have, for the purposes of disclosure, illustrated my invention in one of its forms only but I would have it understood that it is susceptible of embodiment in other forms without departure from the true spirit and scope of the invention as defined in the appended claims. The drawing represents a partial sectional side elevation of my invention as applied to a motorcycle.

In this drawing 10 indicates the main frame of the motorcycle which may be of the usual construction and is provided with rear forks which are detachably fastened at each side of the traction wheel 15 to the power unit. This power unit comprises the internal combustion engine 20 at one side of the wheel and a suitable transmission mechanism which is not shown in the drawing as it does not form a part of this invention. The engine 20 is shown in the illustration as being of the single cylinder four cycle type altho obviously a two cycle or a multi-cylinder engine or other type of primemover can be used if desired. The main or crank shaft of this engine is connected, thru the bevel pinion 18 and intermeshing bevel gear 19, to the starter shaft 25 which shaft extends forward to connect at its forward end with the starting pedal 35, which is pivoted at a convenient place on the frame 10, when said pedal is depressed thru a segmented gear 36 on the starter pedal coming into mesh with the pinion 26 on the end of the shaft. These latter gears only come into action when starting the engine and in order to allow for the rotation of the engine should it start while they are still kept in mesh the pinion 26 is connected to the shaft 25 thru a suitable ratchet device 64 such as is customary with the pinions of starting mechanisms of motorcycles. The starter shaft is shown as also provided with a suitable gear 24 arranged to drive another gear 17 on the magneto, lighting generator or other apparatus 28 which appartaus is shown as mounted with its rotating member parallel with the starter shaft but obviously can be arranged with its rotating member's axis cross-wise by using bevel or spiral gearing. The shaft 25, in addition to these starting and magneto driving functions, is provided adjacent to the engine with, as the engine shown is of the four cycle type, a cam 21 for opening the inlet valve and a cam 22 for opening the exhaust valve. When thus fitted to operate the valves the gears 18 and 19 are arranged so that the shaft 25 would turn at one-half the speed of the engine crank shaft while, when a two cycle engine is used, it may be arranged to turn at any desired speed.

The shaft is carried by a bearing 27 at its rear between the two valve cams and by a bearing 63 at its forward end adjacent to the pinion 26.

The remaining parts of the motorcycle can be of the usual design and therefore need not be particularly described.

Having thus described my invention, I claim as new and desire to secure by Letters Patent—

1. In a motor vehicle the combination of a propelling motor, a main shaft in said motor, a second shaft at substantially a right angle to said main shaft and geared thereto, a gear rotatably mounted on said second shaft, a means for connecting said gear with said second shaft to transmit motion between them in one direction only, a segmental gear rotatably supported on said motor vehicle adjacent to the first named gear but normally held out of mesh therewith, and a manually operated means for rotating said segmental gear to bring said segmental gear into mesh with said gear on the second shaft to rotate said second shaft and the main shaft of the motor and start the motor.

2. In a motor vehicle the combination of a traction wheel, a propelling motor, adjacent to the wheel, a main shaft in said motor, a second shaft at substantially a right angle to said main shaft and geared thereto, and means, acting on the end of said second shaft beyond the plane of said wheel, for manually rotating said second shaft to start the motor.

3. In a motor vehicle the combination of a traction wheel, a propelling motor adjacent to said wheel, a main shaft in said motor parallel with the axis of said wheel, a second shaft at substantially a right angle to said main shaft and geared thereto, a valve in said motor, means connected to said second shaft to actuate said valve by its rotation, an electric generator, means also connected to said second shaft to actuate said generator by its rotation, a gear rotatably mounted on said second shaft, a means for connecting said gear with said shaft to transmit motion between them in one direction only, and a manually operated means acting on said gear to rotate said gear, said second shaft and the main shaft of the motor to start the motor.

4. In a motor vehicle the combination of a traction wheel, a propelling motor, a valve in said motor, a main shaft in said motor parallel with the axis of said wheel and within the plane thereof, a second shaft at substantially a right angle to said main shaft and geared thereto, means connected to said shaft to actuate said valve by the rotation of said shaft, an electric generator mounted beyond the plane of said wheel and means also connected to said shaft to actuate said generator by the rotation of said shaft.

5. In a motor vehicle the combination with a rear traction wheel, a front steering wheel and a connecting framing, of a propelling motor within the plane of the rear traction wheel, a main shaft in said motor and substantially parallel with the axis of rotation of said traction wheel and geared thereto, a second shaft geared to said main shaft and with its axis at substantially a right angle to said main shaft and extending beyond the plane of the rear traction wheel, and means acting on the forward end of second shaft and mounted on the frame of the vehicle between said rear traction wheel and front steering wheel for manually rotating said second shaft to start the motor.

In witness whereof, I have hereto set my hand this 30th day of July, 1921.

ALDEN E. OSBORN.